US011238128B2

(12) United States Patent
Gerardin

(10) Patent No.: US 11,238,128 B2
(45) Date of Patent: Feb. 1, 2022

(54) METHOD AND SYSTEM FOR COLLECTING DIGITAL DOCUMENTS FROM A PLURALITY OF SOURCES

(71) Applicant: VALIPAT SA, Brussels (BE)

(72) Inventor: Olivier Gerardin, Uccle (BE)

(73) Assignee: VALIPAT SA, Brussels (BE)

( * ) Notice: Subject to any disclaimer, the term of this patent is extended or adjusted under 35 U.S.C. 154(b) by 0 days.

(21) Appl. No.: 16/344,309

(22) PCT Filed: Dec. 15, 2017

(86) PCT No.: PCT/EP2017/083108
§ 371 (c)(1),
(2) Date: Apr. 23, 2019

(87) PCT Pub. No.: WO2018/114704
PCT Pub. Date: Jun. 28, 2018

(65) Prior Publication Data
US 2019/0272304 A1    Sep. 5, 2019

(30) Foreign Application Priority Data
Dec. 22, 2016    (BE) .................................. 2016/5961

(51) Int. Cl.
G06F 16/958    (2019.01)
G06F 16/957    (2019.01)
(Continued)

(52) U.S. Cl.
CPC .......... *G06F 16/972* (2019.01); *G06F 16/166* (2019.01); *G06F 16/93* (2019.01);
(Continued)

(58) Field of Classification Search
None
See application file for complete search history.

(56) References Cited

U.S. PATENT DOCUMENTS 7,991,790 B2 * 8/2011 Barker .................. G06F 16/275
707/785
8,156,092 B2 * 4/2012 Hewett ................ G06F 16/174
707/698
(Continued)

FOREIGN PATENT DOCUMENTS

BE      1024848 B1    7/2018
FR      2811186 A1    1/2002
(Continued)

OTHER PUBLICATIONS

International Search Report and Written Opinion on corresponding PCT application (PCT/EP2017/083108) from International Searching Authority (EPO) dated Mar. 6, 2018.
(Continued)

*Primary Examiner* — Howard Cortes
(74) *Attorney, Agent, or Firm* — Klein, O'Neill & Singh, LLP

(57) ABSTRACT

A method for collection of digital documents from a plurality of sources, the method comprising:
a step to determine a collection order defining a list of documents to be collected, each document being associated with a determined source and a determined identifier,
a step to generate a plurality of web pages from the collection order, each web page including a loading area associated with each digital document from said source, each loading area being adapted to automatically store a digital document in a memory of a computer management system, and
a step to send a collection email to each source, each collection email sent to a source including a computer link to access the web loading page associated with said source.

9 Claims, 4 Drawing Sheets

(51) Int. Cl.
  *G06F 16/93* (2019.01)
  *G06Q 10/10* (2012.01)
  *G06F 16/16* (2019.01)
  *G06Q 10/00* (2012.01)

(52) U.S. Cl.
  CPC ........ *G06F 16/958* (2019.01); *G06F 16/9574* (2019.01); *G06F 16/986* (2019.01); *G06Q 10/00* (2013.01); *G06Q 10/10* (2013.01); *G06Q 10/107* (2013.01)

(56) References Cited

U.S. PATENT DOCUMENTS

| | | | | |
|---|---|---|---|---|
| 9,176,751 | B2* | 11/2015 | Colelli | G06F 8/60 |
| 9,842,113 | B1* | 12/2017 | Sorvillo | G06F 16/156 |
| 10,025,759 | B2* | 7/2018 | Mulder | G06F 17/10 |
| 2002/0019827 | A1 | 2/2002 | Shiman et al. | |
| 2004/0039795 | A1* | 2/2004 | Percival | G06F 16/958 |
| | | | | 709/218 |
| 2004/0267595 | A1* | 12/2004 | Woodings | G06Q 10/06311 |
| | | | | 705/7.14 |
| 2005/0010799 | A1* | 1/2005 | Kelley | G06Q 10/10 |
| | | | | 726/22 |
| 2008/0278740 | A1* | 11/2008 | Bird | H04L 69/329 |
| | | | | 358/1.15 |
| 2008/0295130 | A1* | 11/2008 | Worthen | H04N 21/85406 |
| | | | | 725/34 |
| 2009/0204521 | A1* | 8/2009 | De Sena | G06Q 20/102 |
| | | | | 705/34 |
| 2010/0145904 | A1* | 6/2010 | Riviello | G06F 16/80 |
| | | | | 707/608 |
| 2011/0055721 | A1* | 3/2011 | Jain | G06Q 30/0276 |
| | | | | 715/748 |
| 2012/0245859 | A1 | 9/2012 | Geradin et al. | |
| 2013/0018845 | A1* | 1/2013 | Macaskill | G06F 16/58 |
| | | | | 707/634 |
| 2013/0046833 | A1 | 2/2013 | Riepling et al. | |
| 2013/0297353 | A1* | 11/2013 | Strange | G06K 9/00449 |
| | | | | 705/4 |
| 2013/0317863 | A1* | 11/2013 | Tofte | G06Q 40/08 |
| | | | | 705/4 |
| 2014/0067929 | A1* | 3/2014 | Kirigin | H04L 67/06 |
| | | | | 709/204 |
| 2014/0289367 | A1* | 9/2014 | Kinebuchi | H04L 67/06 |
| | | | | 709/219 |
| 2015/0026225 | A1* | 1/2015 | Bastide | G06F 16/164 |
| | | | | 707/825 |
| 2015/0135051 | A1 | 5/2015 | Geradin | |
| 2015/0242643 | A1 | 8/2015 | Hankins, Jr. et al. | |
| 2016/0239466 | A1 | 8/2016 | Geradin | |
| 2018/0004711 | A1 | 1/2018 | Geradin | |
| 2018/0246479 | A1* | 8/2018 | Judd | G06F 16/951 |
| 2020/0019827 | A1 | 1/2020 | Howard et al. | |

FOREIGN PATENT DOCUMENTS

| | | |
|---|---|---|
| FR | 2811187 A1 | 1/2002 |
| FR | 2814893 A1 | 4/2002 |
| FR | 2814894 A1 | 4/2002 |
| FR | 2814895 A1 | 4/2002 |
| FR | 2814896 A1 | 4/2002 |
| WO | WO 2016168748 A1 | 10/2016 |

OTHER PUBLICATIONS

English translation of Search Report from the Dutch Patent Office on related Dutch application No. 2020108 dated Jun. 2, 2021.

* cited by examiner

METHOD AND SYSTEM FOR COLLECTING DIGITAL DOCUMENTS FROM A PLURALITY OF SOURCES

TECHNICAL FIELD

This invention relates to the domain of collection of digital documents, particularly using a data processing application accessible from an internet browser.

In many fields of economy (insurance, medical, law, etc.), digital documents derived from different sources have to be collected and distributed to different recipients. For example, in the field of management of invention patent rights, a company that would like to obtain patents in several different jurisdictions must contact an agent in each jurisdiction so that he can perform the necessary actions in order to obtain a patent. Once the actions have been carried out for each jurisdiction, the company must collect the digital documents certifying that the actions have been performed in each jurisdiction (documents filed, translation, official certificates, etc.).

The collection of digital documents is tedious and risky given that many human actions are usually necessary that can lead to mistakes and losses of documents. In practice, in a company, digital documents are collected, renamed and stored manually in compliance with the company's internal directives. If a mistake is made (error in the name, error in the storage location, etc.), it is sometimes impossible to find the digital document and this introduces serious disadvantages.

Several methods of collecting digital documents are known in prior art. A first method consists of collecting documents by electronic mail. This method requires the management of a large mailbox and it includes the above-mentioned disadvantages of renaming and storage.

A second method consists of transferring directly documents onto a management server using an FTP (File Transfer Protocol). Such a transfer requires accesses (user name/password) to be created for each source that issues documents, which is tedious. Furthermore, the renaming disadvantages mentioned above are still applicable.

A third method consists of using a document management program wherein all document types that can be received are listed. In other words, the risk of mistake is transferred to the issuing source of the digital document that must use a graphic interface to precisely select the type of document to be loaded onto the management server. Such a method is restrictive for issuers and is a major source of mistakes. It is also complex to maintain.

Therefore the purpose of the invention is to overcome these disadvantages by disclosing a new system and a new method of collecting digital documents to limit the risk of mistakes, while remaining easy to use and to maintain.

SUMMARY

Consequently, the invention relates to a method for collection of digital documents from a plurality of sources, the method comprising:
- a step to determine a collection order defining a list of digital documents to be collected, each digital document being associated with a determined source and a determined identifier,
- a step to automatically generate a plurality of web loading pages from the collection order, each web loading page being associated with a source and comprising a document loading area associated with each digital document to be collected from said source, each loading area being adapted to automatically store a digital document in a memory of a computer management system and to format it as a function of the identifier of the digital document and of the source associated with said loading area, and
- a step to automatically send a collection email to each source, each collection email sent to a source including a computer link to access the web loading page associated with said source in order to allow the digital documents from each source to be automatically stored and formatted.

Thanks to the invention, each source has easy and practical access to the list of documents that it has to collect for a receiver. The risk of a mistake by a source is thus very much limited because the list is tailored as a function of each source. Indeed, each source has its own web loading page that includes a loading area for each document to be collected.

Furthermore, due to the loading areas each document to be collected is automatically stored and formatted which is an advantage firstly for the source that does not have to name each document individually, and secondly for the receiver that does not have to store the collected document manually in the right storage location. The risk of mistake in collecting documents is thus very much reduced.

It is easy to communicate by email considering that a collection request is received on the source message service with its other messages. Such a message is small in that its main content is a computer access link to the web loading page.

Finally, such a collection system is automated and does not require any manual action once the collection order is determined. Thus, the collection system can advantageously be implemented in an internet computer application to generate a large number of collection orders.

Preferably, the method for collection comprises:
- a step wherein a given source opens the web loading page, using the computer access link,
- a step wherein said given source loads a digital document in a loading area of said web loading page, and
- a step to automatically store and format said digital document in the computer management system.

It is easy to load a document by a given source on a loading area, since each document is associated with a loading area. Advantageously, a graphic presentation facilitates identification by the source of the document to be collected.

Preferably, the loading step is done by sliding the digital document in the loading area using a mouse on a computer terminal connected to the internet network.

Preferably, each identifier comprises a plurality of variables that are preferably kept in order relative to each other by separators. Such variables are used to rename the document uniquely while allowing standard storage.

Preferably, the step to automatically format said digital document comprises a step to rename said digital document, preferably using a naming mask configured to form a file name from variables of the identifier. Thus, all documents are renamed similarly with different variables. The identifiers are preferably different.

More preferably, the method for collection comprises a step wherein said computer management system checks the digital document loaded in said loading area. In particular, the check step is done by the receiver. Such a check step provides an additional limitation on the risk of making mistakes in that the digital document is analysed as it stands.

Preferably, the check step can include one or several of the following automatic actions: a verification of the document type (computer extension, etc.), a verification of the document size, a character recognition step, a step to search in said document for a sign, a word or a picture, etc.

Preferably, the method for collection comprises a step wherein said computer management system refuses to store the digital document loaded in said loading area if the check fails. Thus, refusal takes place before storage and computer formatting in order to allow the source to repeat the loading so that the requested document can be supplied to replace the document loaded by mistake. Advantageously, the receiver does not format and store any incorrect document, which saves time. Thus, a document can be loaded and temporarily stored before being checked.

Preferably, at least one web loading page comprises several loading areas so that several digital documents can be collected from the same source. Thus, the source has a single interface to load each document such that each document is stored and formatted individually.

Preferably, the step wherein a given source opens the web loading page through a computer access link comprises a step to identify said given source, preferably as a preliminary operation. Such an identification step prevents documents from being deposited by unauthorised sources. This is particularly important since storage and formatting are done automatically. Such an identification step secures access to the web loading page from the access link that is received very practically by email. Advantageously, documents are formatted as a function of an identified source.

Preferably, the method comprises a step to automatically generate the collection order from a computer application, preferably accessible from internet. Thus, advantageously, the collection order and the collection take place automatically without any action by the receiver, which saves time. Thus, said receiver can reliably and quickly manage a large number of documents.

According to one preferred aspect, the automatic formatting step of said digital document in the computer management system comprises a step to rename said digital document. Thus, the document can easily by located in the memory. It is also practical to distribute it to a third party.

Preferably, the automatic formatting step of said digital document in the computer management system comprises a step to assign metadata to said digital document, and particularly metadata that depends on the source. Thus, the document can easily be located in the memory, particularly in a database in said memory. Preferably, the metadata are variables of the document identifier and/or the source.

The invention also relates to a computer management system for the collection of digital documents from a plurality of sources, including:
  a storage memory,
  a module to determine a collection order defining a list of digital documents to be collected, each digital document being associated with a determined source and a determined identifier,
  a module to automatically generate a plurality of web loading pages from the collection order, each web loading page being associated with a source and comprising a document loading area associated with each digital document from said source, each loading area being adapted to automatically store a digital document in the memory of the computer management system and to format it as a function of the identifier of the digital document and of the source associated with said loading area, and
  a module to automatically send a collection email to each source, each collection email comprising a computer link to access the web loading page associated with said source in order to allow the digital documents from each source to be automatically stored and formatted.

Such a computer management system can be used to automatically and practically collect a plurality of documents derived from several sources.

BRIEF DESCRIPTION OF THE DRAWINGS

The invention will be better understood after reading the following description given solely as an example with reference to the appended drawings on which.

Note that the figures present the invention in sufficient detail to apply the invention, and obviously said figures can be extended to better define the invention if required.

DETAILED DESCRIPTION

Figure 1:
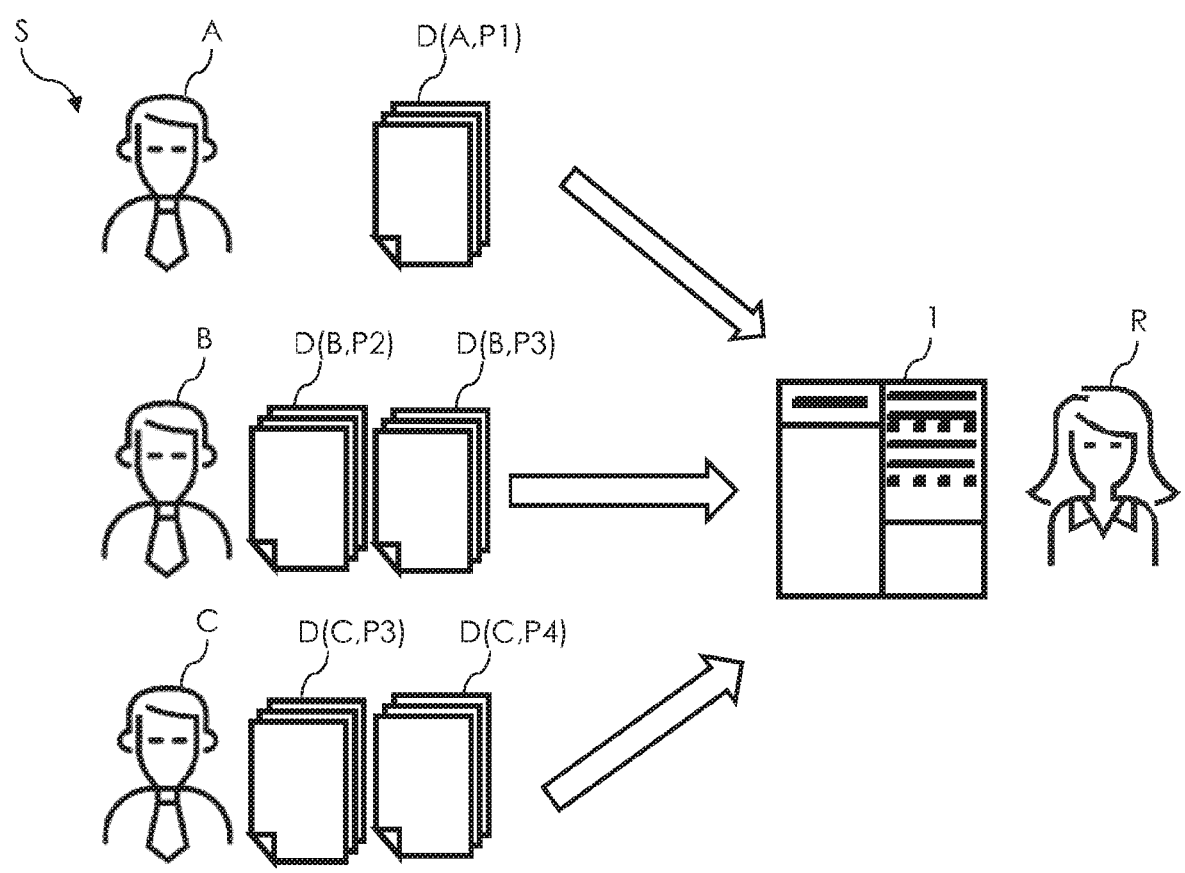
FIG. 1 is a diagrammatic view of an example of a collecting by a receiver of digital documents belonging to several sources.

With reference to FIG. 1, the figure diagrammatically shows an example wherein a receiver R collects a plurality of digital documents D belonging to several different sources S. In this example, there are 3 sources S referenced A, B, C.

The digital documents D may be of any nature and any type. For example, the digital documents D may be technical documents (3D drawing, text document), commercial documents (image, music, etc.), or legal documents (translation, power of attorney, administration documents), etc.

As an example, and still with reference to FIG. 1, the receiver R would like to obtain digital documents D from three different sources A, B, C that are legal agents that manage patent rights in different jurisdictions.

Each digital document D to be collected is associated with a determined source S and a determined identifier P. In this example, the receiver R would like to obtain a document D(A,P1) concerning a particular power of attorney (identifier P1), from the first source A. Similarly, the receiver R would like to obtain a document D(B,P2) concerning a general power of attorney (identifier P2) and a document D(B,P3) concerning a translation, from the second source B. Finally, the receiver R would like to obtain a document D(C,P3) concerning a translation (identifier P3) and a document D(C,P4) concerning a confirmation of a tax payment (identifier P4), from the third source C.

Obviously, each identifier can correspond to a single variable or a combination of variables so as to appropriately identify a digital document D. Preferably, the identifiers are unique so that each document associated with an identifier can be formatted uniquely.

As illustrated in FIG. 1, the digital documents D are collected using a computer management system 1, connected to the internet network, to which the receiver R has access.

The method for collecting digital documents D according to the invention will now be described. The computer management system 1 will be presented after.

Figure 2:
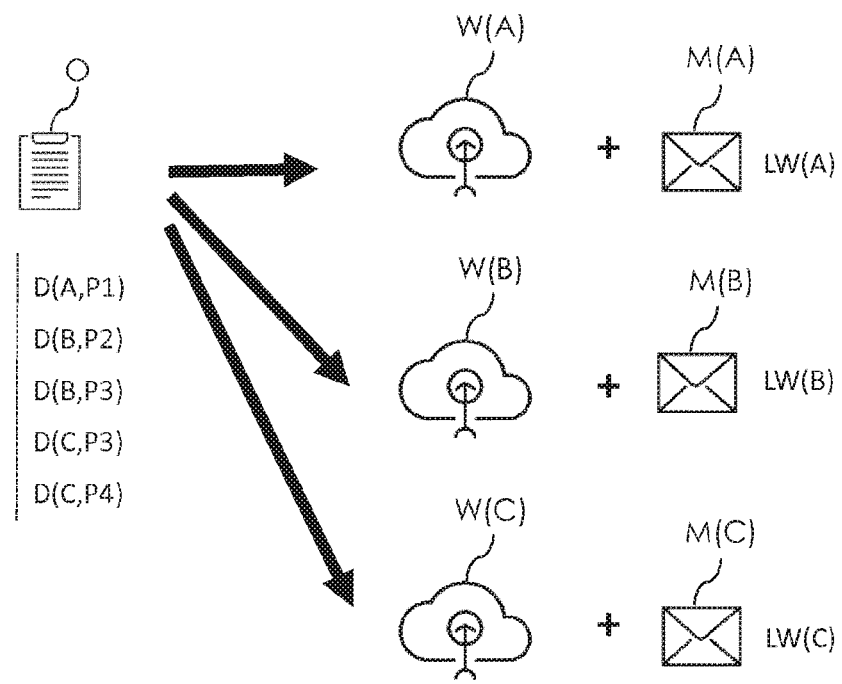
FIG. 2 is a diagrammatic view of a step to automatically generate a plurality of web loading pages and a plurality of document collection emails.

With reference to FIG. 2, in order to be able to collect the documents D in a practical manner, the method for collection according to the invention comprises a step to determine a collection order O defining a list of digital documents D to be collected.

In this example, as illustrated in FIG. 2, the collection order O includes a list of 5 documents D associated with three sources A, B, C and four identifiers P1, P2, P3, P4.

In this example, the collection order O is generated automatically by a business application (not shown) accessible from an internet browser. Nevertheless, it is obvious that the collection order O could be obtained differently, in particular by manual editing, by the use of a download page wherein all criteria (sources, identifiers, etc.) can be selected in a form such that, after validation, the collection order can be sent.

Still with reference to FIG. 2, the method for collection comprises a step for automatic generation of a plurality of web loading pages W from the collection order O. Each web loading page W is associated with a source S so that each source S has its own document loading interface D that simplifies loading of a document D for the source S and limits the risk of mistakes as will be presented after.

Each web loading page W can be accessed through a web access link LW that can be practically input/activated in a browser, for example, by a single mouse click.

The web loading pages W associated with sources A, B, C respectively are subsequently referenced W(A), W(B), W(C) and are accessible through links LW(A), LW(B), LW(C) respectively as illustrated on FIGS. 2 and 4A-4C.

Figure 4A:
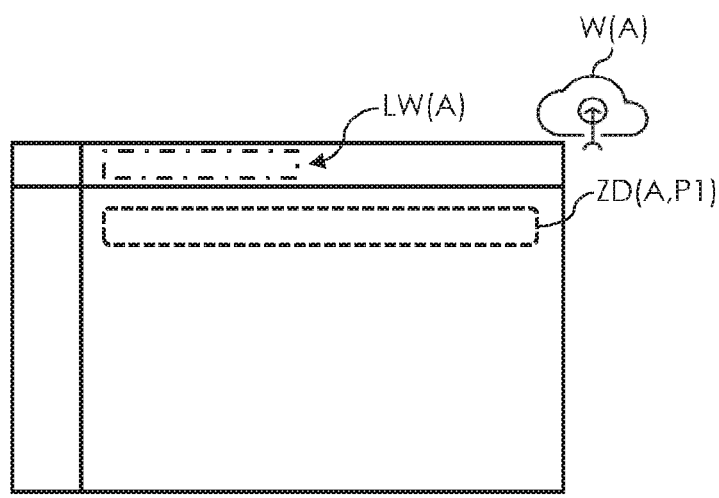
FIGS. 4A, 4B, 4C are diagrammatic views of different web loading pages associated with the different sources.
Figure 4B:
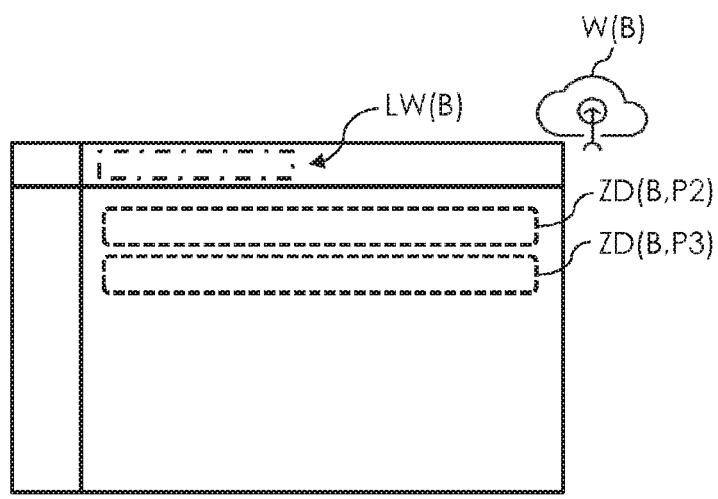
Figure 4C:
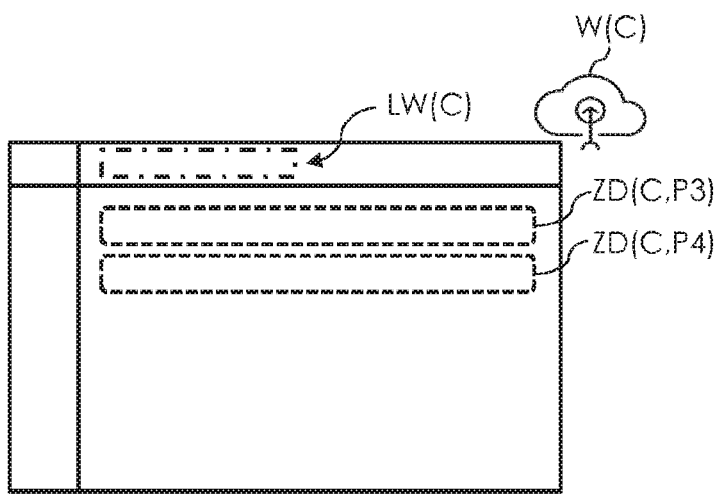

Now with reference to FIGS. 4A to 4C, each web loading page W comprises a document loading area ZD associated with each digital document D of source A, B, C. Thus, with reference to FIG. 4A, the web loading page W(A) associated with source A and accessible through the web link LW(A) includes a unique loading area ZD associated with the digital document D(A,P1) belonging to the first source A. Similarly, with reference to FIG. 4B, the web loading page W(B) associated with source B and accessible through the internet link LW(B), includes two document loading areas ZD associated with digital documents D(B,P2), D(B,P3) respectively belonging to the second source B. Similarly, with reference to FIG. 4C, the web loading page W(C) associated with source C and accessible through the internet link LW(C), comprises two document loading areas ZD associated with digital documents D(C,P3), D(C,P4) respectively belonging to the third source C.

Thus, each document loading area ZD is configured as a function of:
- the source S of the web loading page W wherein loading area ZD is located and
- the identifier P of the digital document D to be loaded for said source S.

Each loading area ZD is adapted to automatically store a digital document D in a memory of the computer management system 1 and to format it as a function of the parameters of said loading area ZD, and in particular the source S and identifier P associated with the document loading area ZD. As will be presented below, formatting refers equally to the definition of the name of said digital document D and to the assignment of metadata for said digital document D.

Preferably, each loading area ZD includes a label corresponding to the identifier P of the document D to be loaded. For example, the identifier P "/upload/VAL/EP1234567/FR_DE/full_translation" is associated with the label "Full translation from FR to DE of patent EP1234567».

Preferably, each identifier P comprises a plurality of variables that are preferably kept in order relative to each other using separators, such as the "I" or a similar symbol. In this example, the identifier P includes the following variables {business unit} {publication number} { iso code of source language}-{iso code of target language} { name}.

Advantageously in this example, each identifier P, in addition to uniquely describing the document D to be loaded, also corresponds to the computer storage path, in other words its tree structure. Each variable of the identifier P advantageously corresponds to a directory and the order of variables defines the storage tree structure. For example, the document D associated with the identifier P "/upload/VAL/EP1234567/FR_DE/full_translation" will be stored in a directory "FR_DE", itself stored in a directory "EP1234567", itself stored in a directory "VAL".

Also preferably, document D is renamed using a naming mask that forms a file name from variables of the identifier P. For example, the naming mask is defined as "{publication number} {iso code of source language}-{iso code of target language} {name}.{ext}". In this example, the document to be loaded D is renamed as follows: EP1234567 FR_DE full_translation.pdf.

Also preferably, the document D includes metadata in order to allow a practical search for it and/or manipulation of it. In this example, the metadata for document D include in particular the identity of the source. Preferably, the metadata of a document also include the loading time by the source S, the processing time by the receiver 1, the original name of document D, the status of document D (new, error, etc.), the country concerned by document D, the department concerned by document D, the type of document D (PDF, WORD), etc. Thus, formatting of a digital document D depends on the source S and the identifier P.

An identifier P thus helps to store and format a document D in a unique and practical manner.

Additionally with reference to FIG. 2, the method of collection comprises a step for automatic generation of a plurality of collection emails M from the collection order O. Each collection email M comprises a computer access link LW to the web loading page W associated with said source S in order to allow the digital documents D from each source S to be automatically stored and formatted.

Also preferably, each collection email M comprises a list of digital documents D to be collected for each source S.

Preferably, each collection email M comprises informations about the source S, particularly, an email address, the source name, the source language, etc. Preferably, the informations about the source S are included in the collection order O or obtained in a database from said connection order O.

Figure 3:
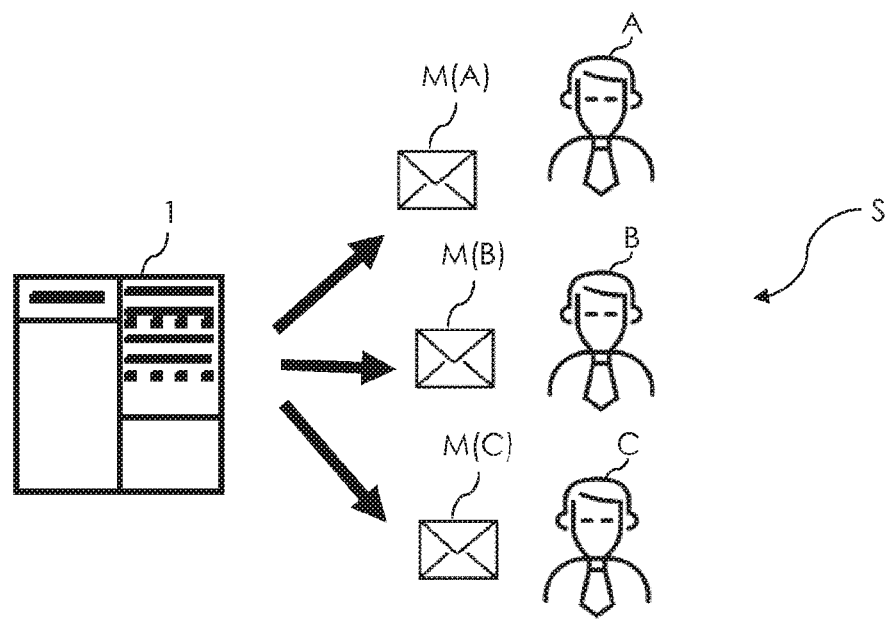
FIG. 3 is a diagrammatic view of a step to send said emails to the different sources.

With reference to FIG. 3, the method for collection comprises a step wherein the management system 1 automatically sends a collection email M to each source S. Preferably, the send step is done directly after the step wherein said collection emails M are generated.

In this case, three collection emails M(A), M(B), M(C) are addressed to sources A, B, C respectively so that said sources A, B, C can access the web loading pages W(A), W(B), W(C) respectively through access links LW(A), LW(B), LW(C).

Preferably, each source S is equipped with a computer communication terminal that includes a message service and an internet browser. The computer terminal is also provided with a keyboard and a mouse.

After the collection email M addressed to each source S has been received, each source S accesses its own specific web loading page W and deposits the digital document D to be stored and formatted in the dedicated loading area ZD in the web loading page W. After the deposit, the digital document D is "loaded", in other words is temporarily stored so that it can be checked before being permanently stored.

Figure 5:
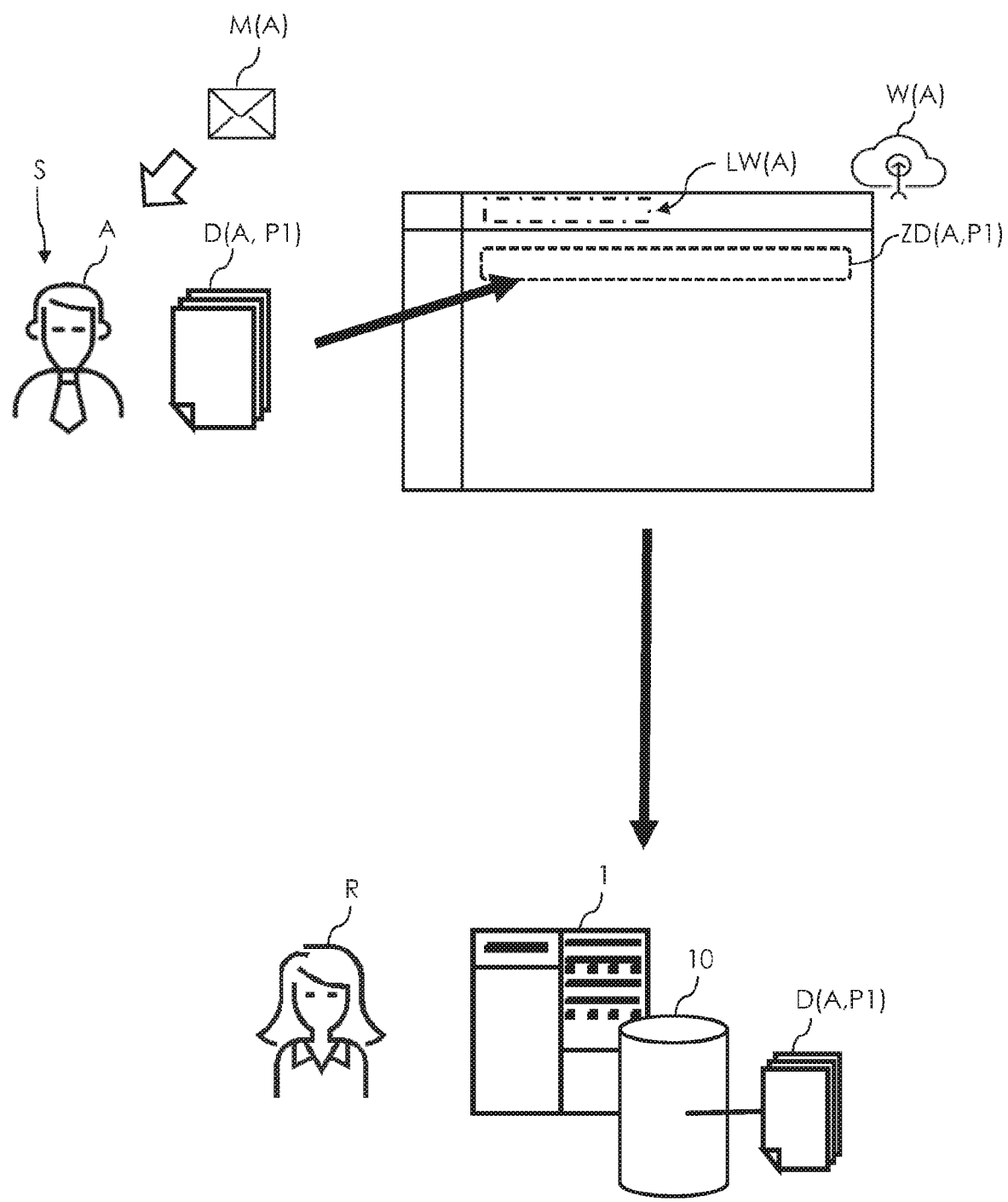
FIG. 5 is a diagrammatic view of a step wherein a source loads a digital document using the web loading page in FIG. 4A.

For example, with reference to FIG. 5, the source A received an email M(A) on its message service containing an access link LW(A) to the web loading page W(A) and the list of digital documents to be collected D(A, P1).

After the access link LW(A) has been activated, the web loading page W(A) opens from the source A browser that can then display the only loading area ZD(A, P1) that will receive a particular power. Since there is a label corresponding to the identifier of document P1 in the loading area ZD(A, P1), the source A clearly and unambiguously understands which digital document D has to be loaded in the web loading page W.

In this example, following a simple copy-drag using the mouse on its communication terminal, the source A can deposit the digital document D(A, P1) in the loading area ZD(A, P1).

Preferably, the graphic form of the loading area ZD(A, P1) is modified after the digital document D(A, P1) has been deposited in the loading area ZD(A, P1). For example, it might change colour or its label might be changed to confirm to the source A that a digital document D(A, P1) has been deposited.

The document D(A,P1) is then stored in the memory of the management system 1 and formatted as a function of the source A and the identifier P1 in order for it to be able to be optimally referenced in the management system 1 as described above. In this example, the identity of the source A can be used to define a metadata of document D while the identifier P1 can be used to define metadata, the name of the document D and its storage path. Advantageously, the identity of the source S is easily obtained during identification of the source S to the loading page LW(A).

Advantageously, there is no need for the source A and for the receiver R to rename and/or reference the document D(A,P1) and to specify the storage location.

When several documents with the same identifier P3 are requested from different sources B, C as illustrated on FIG. 1, the documents can advantageously be differentiated by their metadata. The identifiers are preferably unique.

In order to be sure that the stored digital documents D are those expected by the receiver R, the method for collection includes, before the storage step, a step wherein said computer management system 1 checks the digital document D loaded in said storage area ZD.

Preferably, the check step is done by the receiver R previewing the digital document D directly in an internet browser. Subsequent to the preview, the receiver R can either "accept" the digital document D that will then be stored, or "refuse" the digital document, specifying the reason for refusal that will result in alerting the source A by sending another collection mail M(A) to it, including the reason for refusal.

Depending on needs, several documents can also be deposited at the same time in a single loading area ZD. In this case, the documents at source A have to be named precisely.

The invention also relates to a computer management system 1 that is in the form of a server or several servers connected to the internet network. The management system 1 is administrated by the receiver so as to collect services by clients, request determined documents at different sources as a function of ordered services, and collect them and communicate them to its clients.

The management system 1 includes a storage memory 10 and a module for determining a collection order O defining a list of digital documents D to be collected. In this example, the management system 1 comprises a business application module accessible from an internet browser so that clients can order services from the receiver R. The business application module can generate a collection order O as a function of the ordered services.

The management system 1 also includes a module to automatically generate a plurality of web loading pages W as presented above, from the collection order O.

The management system 1 also includes a module that automatically sends a collection email M to each source S in order to allow the digital documents D from each source S to be automatically stored and formatted.

Thanks to the invention, many digital documents can be reliably and practically collected in a management system from a large number of sources. This advantageously makes collected documents quickly available to third parties.

The invention claimed is:

1. A method for collection of digital documents from a plurality of sources, the method comprising, in sequence:
   a step to generate, by a business application, a collection order defining a list of digital documents to be collected, a source for each digital document, and an identifier for each digital document;
   a step to automatically generate, by the business application, a plurality of web loading pages as a function of the generated collection order;
      wherein each web loading page is associated with a source of the generated collection order;
      wherein each web loading page for the associated source of the generated collection order comprises at least one document loading area for each digital document for the associated source of the generated collection order, wherein each document loading area is configured by the business application as a function of said source associated with said web loading page and said identifier of each digital document associated with said source;
      wherein each document loading area has a label corresponding to said identifier associated with each digital document to be collected from said source;
      wherein at least one web loading page comprises at least two document loading areas having different labels for each document loading area;
      wherein at least two of the plurality of web loading pages have different labels; and
      wherein each discrete document loading area on a web loading page is adapted to automatically store a digital document in a memory of a computer management system and to format said automatically stored digital document as a function of the identifier of the digital document and of the source associated with said loading area; and
   a step to automatically send, by the business application, a collection email to each source of the generated collection order, each collection email sent to a source including a computer link to access the generated web loading page associated with said source of the generated collection order to allow the digital documents from each source to be automatically stored and formatted.

2. The method for collection according to claim 1, comprising:
- a step wherein a given source opens the web loading page, using the computer access link,
- a step wherein said given source loads a digital document in a loading area of said web loading page, and
- a step to automatically store and format said digital document in the computer management system.

3. The method for collection according to claim 2, wherein the step to automatically format said digital document in the computer management system comprises a step to rename said digital document.

4. The method for collection according to claim 3, wherein the identifier comprising a plurality of variables, the method comprises a step to rename said digital document using a naming mask configured to form a file name from variables of the identifier.

5. The method for collection according to claim 2, wherein the step to automatically format said digital document in the computer management system comprises a step to assign metadata to said digital document.

6. The method for collection according to claim 2, comprising a step wherein said computer management system checks the digital document loaded in said loading area.

7. The method for collection according to claim 1, comprising a step to automatically generate the collection order from a computer application, preferably accessible from internet.

8. The method for collection according to claim 1, wherein each identifier comprises a plurality of variables that are preferably kept in order relative to each other by separators.

9. The method for collection according to claim 1, wherein at least two of the several loading areas of the at least one web loading page are discrete loading areas located in different locations on the same web loading page, and wherein the labels of the at least one web loading page are different from labels of another at least one web loading page of the plurality of web loading pages.

* * * * *